(12) United States Patent
Binder

(10) Patent No.: US 9,630,468 B2
(45) Date of Patent: Apr. 25, 2017

(54) AIR SPRING, IN PARTICULAR FOR VEHICLES

(71) Applicant: Continental Teves AG & Co. oHG, Frankfurt (DE)

(72) Inventor: Klaus Binder, Sarstedt (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 14/780,691

(22) PCT Filed: Mar. 25, 2014

(86) PCT No.: PCT/EP2014/055893
§ 371 (c)(1),
(2) Date: Sep. 28, 2015

(87) PCT Pub. No.: WO2014/166726
PCT Pub. Date: Oct. 16, 2014

(65) Prior Publication Data
US 2016/0059655 A1 Mar. 3, 2016

(30) Foreign Application Priority Data
Apr. 9, 2013 (DE) .................. 10 2013 206 235

(51) Int. Cl.
*F16F 9/04* (2006.01)
*B60G 11/27* (2006.01)
(52) U.S. Cl.
CPC ............ *B60G 11/27* (2013.01); *F16F 9/0454* (2013.01); *B60G 2202/152* (2013.01)
(58) Field of Classification Search
CPC ...... F16F 9/0454; F16F 9/0463; F16F 9/0445; F16F 9/04; F16F 9/05; B60G 11/27; B60G 2202/152

(Continued)

(56) References Cited

U.S. PATENT DOCUMENTS

| 6,536,749 B1 | 3/2003 | Luhmann |
| 6,637,733 B1 | 10/2003 | Weitzenhof |

(Continued)

FOREIGN PATENT DOCUMENTS

| CN | 1659390 | 8/2005 | |
| DE | EP 0548581 A1 * | 6/1993 | ............ F16F 9/0463 |

(Continued)

OTHER PUBLICATIONS

Chinese Office Action dated Apr. 25, 2016 for Chinese Application No. 201480019990.1, including English translation, 10 pages.

(Continued)

*Primary Examiner* — Thomas J Williams
(74) *Attorney, Agent, or Firm* — RatnerPrestia

(57) ABSTRACT

An air spring, in particular for vehicles, which is clamped with an air spring piston and an air spring cover between the chassis and the vehicle body of a motor vehicle, including an air spring bellows, which is sealingly fixed on the air spring cover and air spring piston, is made of an elastomeric material, at least partially delimits a working chamber filled with compressed air, and which unrolls to form at least one rolling fold on the air spring piston, wherein an end region of the air spring bellows is secured on a clamping section of the air spring cover by a clamping ring. An additional ring is provided, which is arranged in the end region of the air spring bellows and outside the clamping section in order to relieve the clamping ring, wherein the inner diameter thereof substantially corresponds to an inner diameter of the clamping ring.

7 Claims, 2 Drawing Sheets

(58) Field of Classification Search
USPC .............................................. 267/64.27, 122
See application file for complete search history.

(56) References Cited

U.S. PATENT DOCUMENTS

| | | | |
|---|---|---|---|
| 6,749,184 B2 | 6/2004 | Wode | |
| 8,540,221 B2* | 9/2013 | Watanabe | F16F 9/0454 267/64.24 |
| 9,366,304 B2* | 6/2016 | Smith | B60G 11/27 |
| 9,399,379 B2* | 7/2016 | Gleu | B60G 11/27 |
| 2007/0023982 A1 | 2/2007 | Taylor | |
| 2011/0266728 A1 | 11/2011 | Bank | |
| 2014/0027962 A1* | 1/2014 | Behmenburg | F16F 9/0409 267/64.27 |
| 2014/0252743 A1* | 9/2014 | Pielock | F16F 9/049 280/124.157 |

FOREIGN PATENT DOCUMENTS

| | | | |
|---|---|---|---|
| DE | 19809658 A1 * | 9/1999 | ............ F16F 9/0409 |
| DE | 10050028 | 5/2001 | |
| DE | 10050777 | 5/2002 | |
| DE | 60308369 | 9/2007 | |
| EP | 2330313 | 6/2011 | |
| WO | 2004015297 | 2/2004 | |
| WO | 2007018800 | 2/2007 | |
| WO | WO 2012136650 A1 * | 10/2012 | ............ F16F 9/0409 |

OTHER PUBLICATIONS

German Search Report for German Application No. 10 2013 206 235.4 mailed Jun. 3, 2013, including partial translation.
International Search Report for International Application No. PCT/EP2014/055893 mailed Jul. 22, 2014.

* cited by examiner

AIR SPRING, IN PARTICULAR FOR VEHICLES

CROSS REFERENCE TO RELATED APPLICATIONS

This application is the U.S. National Phase Application of PCT International Application No. PCT/EP2014/055893, filed Mar. 25, 2014, which claims priority to German Patent Application No. 10 2013 206 235.4, filed Apr. 9, 2013, the contents of such applications being incorporated by reference herein.

FIELD OF THE INVENTION

The invention relates to an air spring, in particular for vehicles, which is clamped with an air spring piston and an air spring cover between the running gear and the vehicle body of a motor vehicle, having an air spring bellows, which is sealingly secured on the air spring cover and the air spring piston, is made of an elastomeric material, at least partially delimits a working chamber filled with compressed air, and unrolls so as to form at least one rolling fold on the air spring piston, wherein an end region of the air spring bellows is secured on a clamping section of the air spring cover by means of a clamping ring.

BACKGROUND OF THE INVENTION

Air spring devices, also referred to as air springs for short, which are clamped between the running gear and the body and have an air spring bellows which, in turn, is secured between the air spring components comprising the air spring cover and the air spring piston, are known in a large number of embodiments. In operation, the air spring is under an internal excess pressure. Under load and in the case of springing movements, the air spring bellows rolls on the outer contour of at least one air spring piston, forming a rolling fold. An air spring of this kind is often used in road or rail vehicles in order to achieve comfortable springing.

In this context, there are both air springs on which the air spring bellows forms a rolling fold on only one side, namely in general on the air spring piston, and air springs on which the air spring bellows is clamped between the air spring cover and the air spring piston and forms a (rolling) fold on both sides.

To secure the end region of the air spring bellows on the air spring cover, use is generally made of clamping rings which can be deformed elastically in a radial direction and which clamp the end region of the air spring bellows positively and frictionally on the clamping section of the air spring cover.

However, the internal excess pressure and the resulting forces in the working chamber of the air spring mean that the clamped joint between the air spring bellows and the air spring cover and/or air spring piston is subject to high loads, with the result that there is the risk that the end of the air spring bellows will be pulled out of the clamped joint, i.e. from under the clamping ring. Moreover, the leaktightness in the clamping region decreases especially when there are large temperature fluctuations.

Radial force components furthermore ensure that the bellows pressure is reduced since the air spring bellows produces an expansion of the clamping ring when subjected to pressure.

A large number of fastening variants is known for the purpose of securing the air spring bellows on one of the air spring components. For example, DE 100 50 777 A1, which is incorporated by reference, describes an air spring having a convex-shaped clamping region of the air spring cover, on which a concave-shaped clamping ring is press-fitted. However, it has been found that the problems described can only be solved to a limited extent in the case of the known clamped joints.

SUMMARY OF THE INVENTION

An aspect of the invention provides an air spring that is improved in this respect, on which pulling the air spring bellows out of the clamped joint is prevented or at least made significantly more difficult and the leaktightness of which can be ensured.

According to an aspect of the invention, an additional ring is provided, which is arranged in the end region of the air spring bellows and outside the clamping section in order to relieve the clamping ring, wherein the inside diameter thereof substantially corresponds to an inside diameter of the clamping ring. The relief ring can absorb the radial loads, bringing significant relief to the clamping ring. It is thereby possible to ensure that the pressure of the clamping ring is not reduced. Moreover, there is no risk that the air spring bellows will be pulled out of the clamped joint.

According to an advantageous embodiment, it is possible in a simple and economical manner to provide the relief ring so as to be positioned on the air spring bellows by means of air pressure in the working chamber.

In contrast, an alternative embodiment of the invention envisages that the relief ring is provided so as to be positioned on the air spring bellows by means of an inner ring. For this purpose, the relief ring is provided so as to be pressed onto the inner ring.

According to another embodiment, the air spring bellows has vulcanized-on positioning means for positioning the relief ring, thereby making possible a significant simplification in the mounting of the relief ring.

The air spring bellows preferably has at least one encircling bead for positioning the relief ring.

As an alternative, a plurality of rubber noses can be provided so as to be vulcanized onto the air spring bellows for positioning the relief ring.

Further features, advantages and possible uses of the invention will become apparent from the dependent claims and from the following description of illustrative embodiments and with reference to the drawing.

BRIEF DESCRIPTION OF THE DRAWINGS

In the drawing, in which each of the figures is highly schematized and in section.

DETAILED DESCRIPTION OF THE PREFERRED EMBODIMENTS

Figure 1:
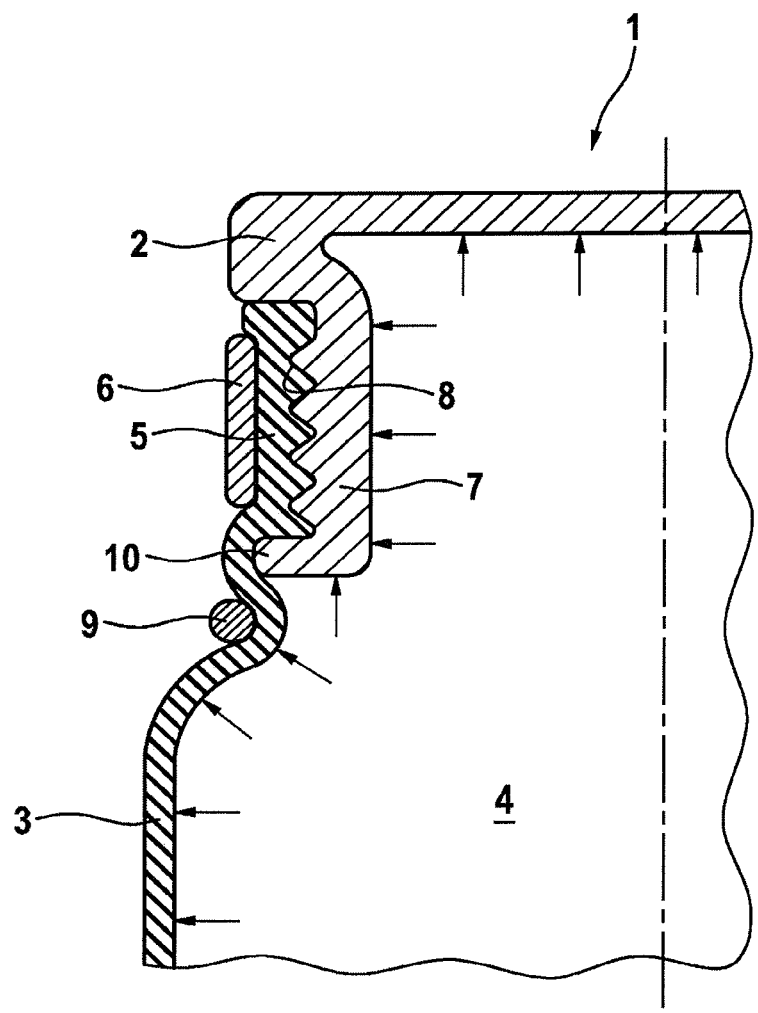
FIG. 1: shows a detail of a first illustrative embodiment of an air spring according to the invention.

In schematic representation and in section, FIG. 1 shows a detail of a first illustrative embodiment of an air spring 1, which is clamped with an air spring piston (not shown) and an air spring cover 2 between the running gear and the vehicle body of a motor vehicle.

The air spring 1 has an air spring bellows 3, which is sealingly secured on the air spring cover 2 and the air spring piston, is made of an elastomeric material, at least partially delimits a working chamber 4 filled with compressed air, and unrolls so as to form at least one rolling fold (not shown) on the air spring piston.

As can be seen in the figure, an end region 5 of the air spring bellows 3 is secured on a clamping section 7 of the air spring cover 2 by means of a clamping ring 6. The internal excess pressure and the resulting forces (indicated by arrows) in the working chamber 4 of the air spring 1 mean that the clamped joint between the air spring bellows 3 and the air spring cover 2 is subject to high loads.

The clamping section 7 therefore has a plurality of encircling grooves 8, into which the material of the air spring bellows 3 penetrates when the clamping ring 6 is compressed. On the one hand, these serve to make it more difficult for the air spring bellows 3 to be pulled out of the clamped joint and, on the other hand, leaktightness in the clamping region in the case of large temperature fluctuations is thereby improved.

In order to eliminate the risk of pulling out and to ensure the leaktightness of the clamped joint, an additional ring 9 for relieving the clamping ring 6 is arranged in the end region 5 of the air spring bellows 3 and outside the clamping section 7. The inside diameter thereof substantially corresponds to an inside diameter of the clamping ring 6. This enables the radial loads to be absorbed by the additional ring 9, which is referred to below as a relief ring, with the result that the clamping ring 6 is significantly relieved and the pressure of the clamping ring 6 is not reduced.

In the embodiment shown, the relief ring 9 is moved into position manually, at least during the first phase of the inflation of the air spring 1, this being a simple and economical method.

For this purpose, the relief ring 9 is fitted to the clamping ring 6 manually from below or, in this example shown, to an encircling bead 10 of the clamping section 7 prior to the inflation of the air spring 1. Due to the inflation of the air spring 1, the bellows diameter increases and holds the relief ring 9 against gravity, initially by means of friction, ensuring that the relief ring 9 no longer falls downward in the drawing and manual positioning is no longer necessary. The relief ring 9 is thus positioned on the air spring bellows 3 by means of the air pressure in the working chamber 4. On further inflation—either to the shipping pressure or to the operating pressure—the bellows diameter increases further, ensuring that the air spring bellows automatically presses the relief ring 9 upward against the clamping ring 6 or the bead 10.

Figure 2:
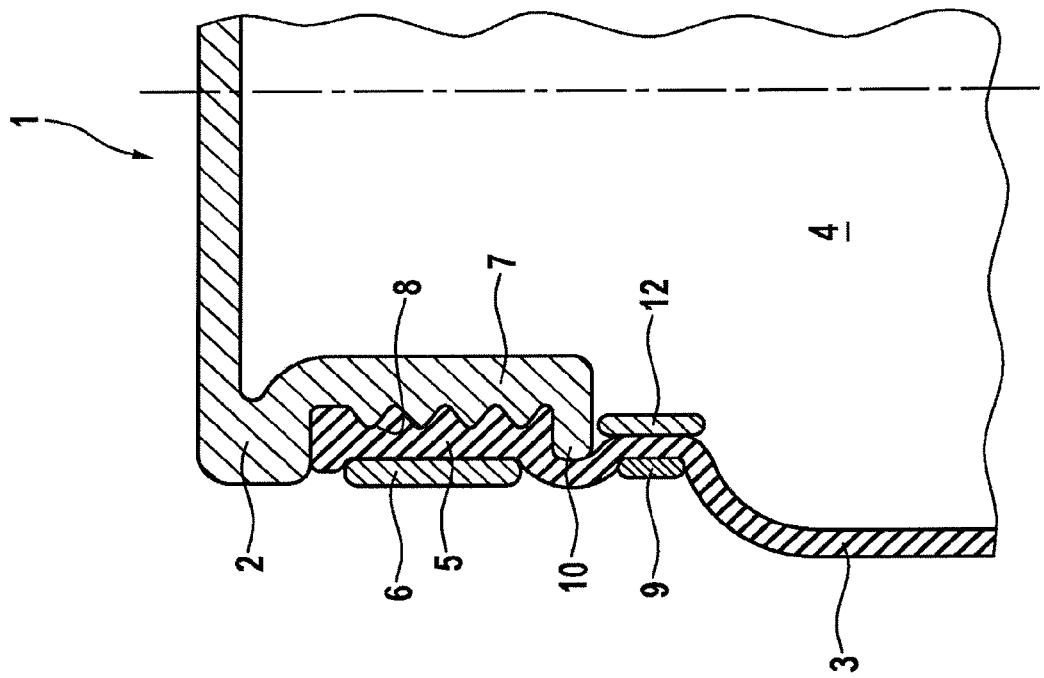
FIG. 2: shows a detail of a second illustrative embodiment of an air spring according to the invention.
Figure 3:
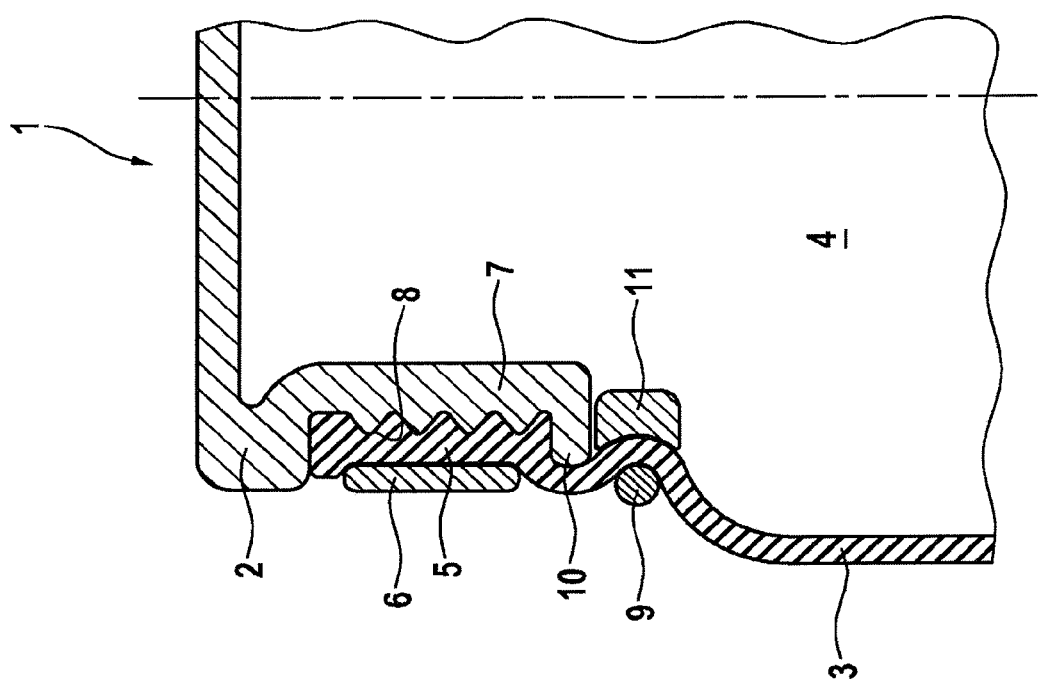
FIG. 3: shows a detail of a third illustrative embodiment of an air spring according to the invention.

According to FIGS. 2 and 3, in contrast, a second and a third illustrative embodiment of the invention envisage that the relief ring 9 is positioned on the air spring bellows 3 by means of an inner ring 11 and 12, respectively.

For this purpose, the inner ring 11 or 12 is positioned in the air spring bellows 3 on the bead 10 of the clamping section 7, onto which the relief ring 9 is press-fitted over the air spring bellows 3 radially from the outside. In this case, the diameter of the relief ring 9 is initially larger than its final diameter. In this illustrative embodiment, the relief ring 9 is thus plastically deformed in a radial direction and pressed onto the inner ring 11 or 12. As can be seen from FIGS. 2 and 3, the inner ring 11 or 12 can have different configurations matched to the shape of the relief ring 9.

According to other alternative embodiments, the air spring bellows 3 can furthermore have vulcanized-on positioning means for positioning the relief ring 9 for example, thereby enabling the mounting of the relief ring 9 to be considerably simplified.

Here, individual vulcanized-on rubber noses distributed over the air spring bellows 3 are conceivable for instance, said rubber noses allowing positioning of the relief ring 9 without the relief ring 9 falling off, even while the air spring bellows 3 is still unpressurized.

Moreover, the air spring bellows 3 can have at least one encircling bead for positioning the relief ring 9.

LIST OF REFERENCE SIGNS 1 air spring
2 air spring cover
3 air spring bellows
4 working chamber
5 end region
6 clamping ring
7 clamping section
8 groove
9 ring/relief ring
10 bead
11 inner ring
12 inner ring

The invention claimed is:

1. An air spring, for vehicles, which is clamped with an air spring piston and an air spring cover between the running gear and the vehicle body of a motor vehicle, having an air spring bellows, which is sealingly secured on the air spring cover and the air spring piston, is made of an elastomeric material, at least partially delimits a working chamber filled with compressed air, and unrolls so as to form at least one rolling fold on the air spring piston, wherein an end region of the air spring bellows is secured on a clamping section of the air spring cover by a clamping ring, wherein a relief ring is provided, which is arranged in the end region of the air spring bellows and below an axial end of the clamping section in order to relieve the clamping ring, wherein an inside diameter thereof substantially corresponds to an inside diameter of the clamping ring, and wherein the relief ring is positioned on the air spring bellows such that the air spring bellows extends radially inward from the axial end of the clamping section.

2. The air spring as claimed in claim 1, wherein the relief ring is provided so as to be positioned on the air spring bellows by air pressure in the working chamber.

3. The air spring as claimed in claim 1, wherein the relief ring is provided so as to be positioned on the air spring bellows by an inner ring.

4. The air spring as claimed in claim 3, wherein the relief ring is provided so as to be pressed onto the inner ring.

5. The air spring as claimed in claim 1, wherein the air spring bellows has vulcanized-on positioning means for positioning the relief ring.

6. The air spring as claimed in claim 5, wherein the air spring bellows has at least one encircling bead for positioning the relief ring.

7. The air spring as claimed in claim 5, wherein a plurality of rubber noses are provided so as to be vulcanized onto the air spring bellows for positioning the relief ring.

* * * * *